May 25, 1943.  E. R. KNOWLTON ET AL  2,320,283
SEA MOSS HARVESTING APPARATUS
Filed Oct. 17, 1941  3 Sheets-Sheet 1

INVENTORS:
Edward R. Knowlton,
George F. Doucette,
John W. Eager,
BY
their ATTORNEY.

May 25, 1943.  E. R. KNOWLTON ET AL  2,320,283
SEA MOSS HARVESTING APPARATUS
Filed Oct. 17, 1941  3 Sheets-Sheet 2

INVENTORS:
Edward R. Knowlton
George F. Doucette
BY John W. Eager,
their ATTORNEY.

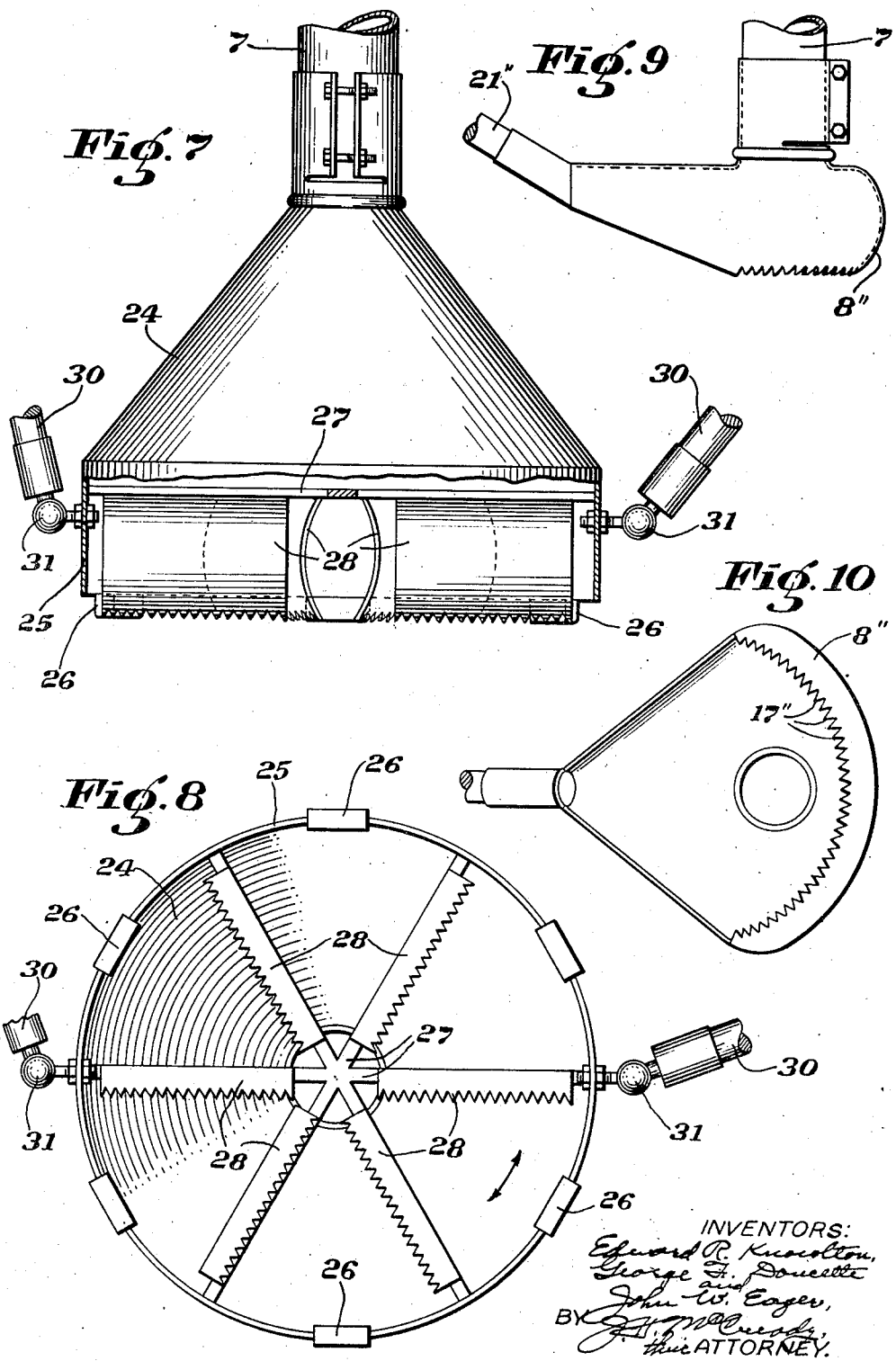

Patented May 25, 1943

2,320,283

UNITED STATES PATENT OFFICE 2,320,283

SEA MOSS HARVESTING APPARATUS

Edward R. Knowlton, Rockport, George F. Doucette, Gloucester, and John W. Eager, Fitchburg, Mass.

Application October 17, 1941, Serial No. 415,480

12 Claims. (Cl. 56—9)

The marine vegetable growth known botanically as *Chondrus crispis*, and more commonly called by such names as "sea moss," "Irish moss," or "carrageen," has long been used commercially as a raw material source of certain chemicals, some food stuffs, and other materials. The time-honored method of collecting it is by hand, the operation usually consisting in raking it off the under-water rocks and ledges at low tide, and then handling the material so gathered in much the same manner as hay. It grows in relatively small bunches or clumps resembling heads of lettuce in size and shape but having a very different leaf formation, and the better this original form is preserved the higher the price which it commands in the trade. That is, the bunches gathered approximately whole bring a higher price than does the same material when chopped, mangled, or more or less shredded.

The present invention aims to devise an apparatus with which the harvesting of this material can be performed far more economically than by prior art methods. It is also an object of the invention to devise means for collecting sea moss in its relatively undamaged form.

The nature of the invention will be readily understood from the following description when read in connection with the accompanying drawings, and the novel features will be particularly pointed out in the appended claims.

In the drawings,

Figs. 7 and 8 are front and bottom views, respectively, of still another form of moss removing implement or rake; and Figs. 9 and 10 are similar views of still another embodiment of this feature of the invention.

Figure 1:
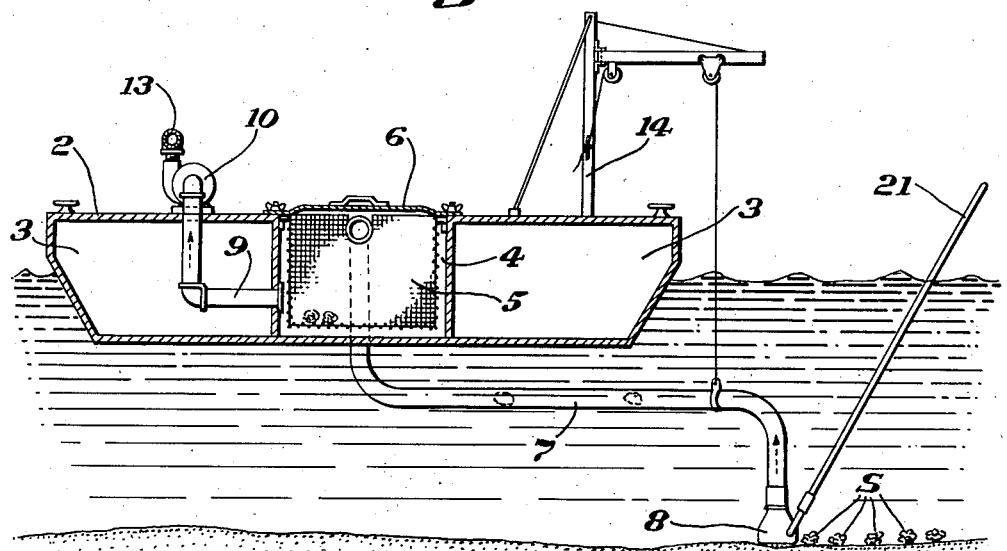
Figure 1 is a side elevation, partly in vertical section, showing somewhat diagrammatically a typical embodiment of the invention.
Figure 2:
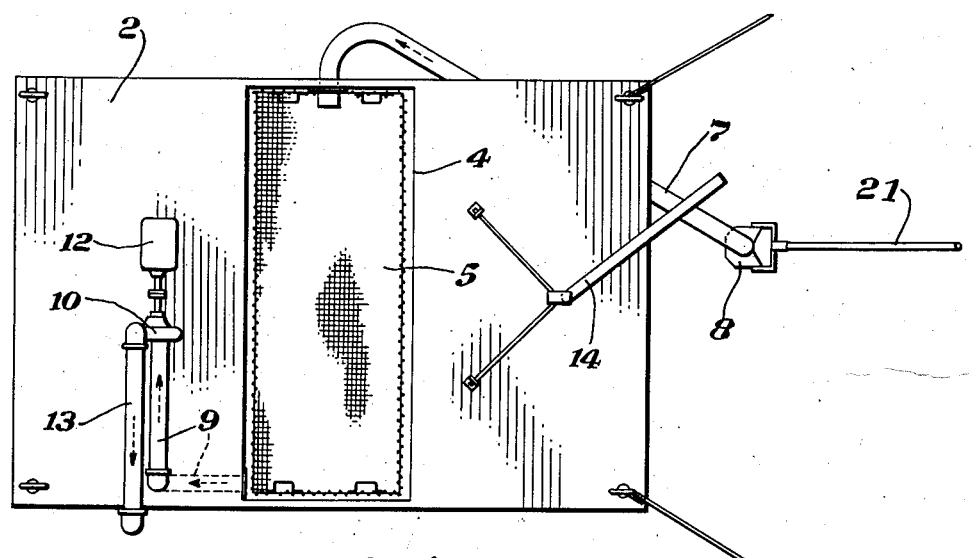
Fig. 2 is a plan view of the apparatus shown in Fig. 1 with the cover of the tank removed.

Referring first to Figs. 1 and 2, the apparatus there shown comprises a barge or equivalent conveyance 2 equipped, if necessary, with air chambers 3 to give it the desired degree of buoyancy. It is also fitted with a tank 4 in which a foraminous receptacle or screen 5 is mounted, these parts being so designed that the screen is spaced from the surrounding walls and can readily be removed. A removable cover 6 normally closes the top of the tank and is clamped in place by bolts, or in any other convenient manner, a gasket being interposed between the top of the tank and the cover so that the closure may be made approximately air tight. Pipe connections 7 of some suitable form as, for example, a suction hose, lead through the wall of the tank and into the receptacle 5 and connect this part of the apparatus with a moss loosening implement or rake 8. Leading from the tank near the bottom thereof is an intake pipe 9 of a suction pump 10 arranged to be driven by a gasolene motor 12, or in any other convenient manner, the discharge pipe 13 running from this pump overside. Preferably a simple form of derrick 14 is provided to support the greater part of the weight of the suction pipe 7.

Figure 3:
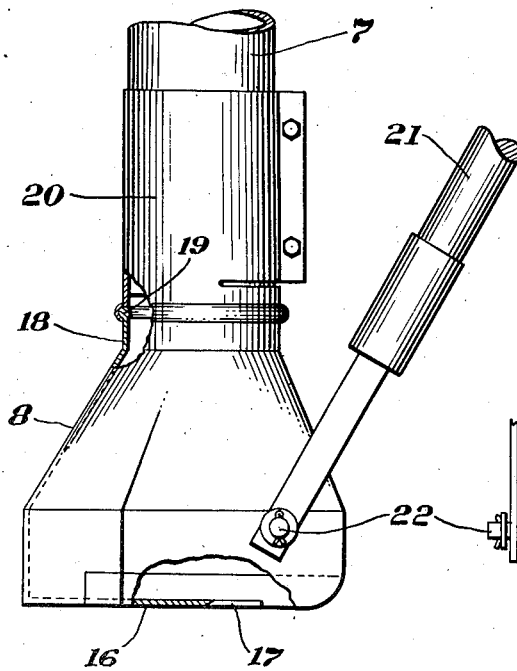
Fig. 3 is a side elevation, partly in section, of a rake or moss gathering implement which forms a novel feature of the invention.
Figure 4:
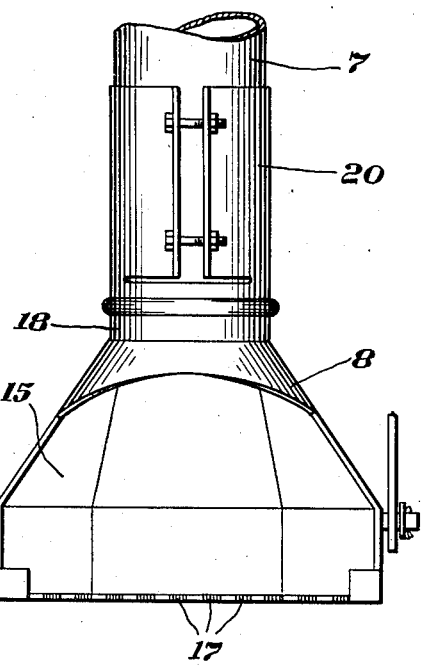
Fig. 4 is a front elevation of the implement shown in Fig. 3.
Figure 5:
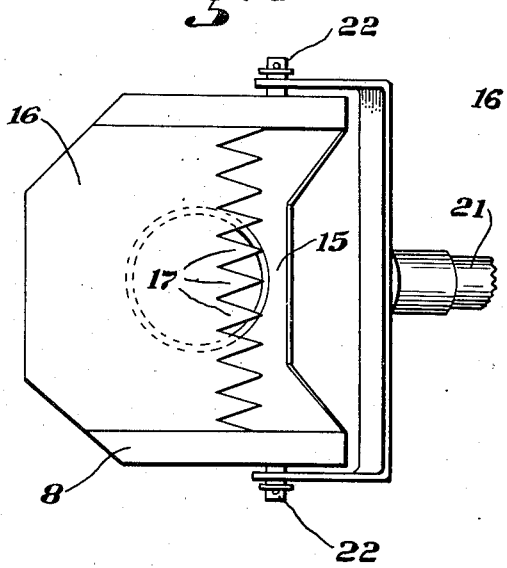
Fig. 5 is a bottom view of said implement.

The novel form of rake illustrated in Fig. 1 is better shown in Figs. 3, 4 and 5. It comprises a hollow casing or housing, which may conveniently be made of sheet metal, open at its forward side, as shown at 15, and partially closed at the bottom by a plate 16 having a series of teeth 17 formed in the forward edge thereof. The upper portion of this casing is tapered to a smaller diameter and terminates in a tubular collar section 18 provided with a circular bead 19 which fits into the lower circumferential groove in a connector 20 adapted to be clamped upon or connected with the lower end of the hose or pipe 7 in any convenient manner. This connection between the parts, however, provides a swivel joint permitting the rake itself to rotate about a vertical axis relatively to the pipe 7. A handle 21 is pivotally mounted on studs 22—22 projecting from opposite sides of the casing and is made of sufficient length to facilitate operation by the workman.

In using this apparatus the barge is anchored at a suitable location, and the workman loosens the bunches of sea moss, such as those shown at S in Fig. 1, by a raking motion. These bunches of moss grow chiefly on rocks and ledges in water of relatively shallow depth, say up to twelve or fifteen feet, or in that neighborhood, but such that they are always submerged, even at low tide. Consequently, in performing this raking operation the workman may operate either on foot or from the barge 2, but more likely the former. He moves the rake backward and forward while it rests on the surface of the rocks or ledges on which the moss is growing so that the teeth of the rake slide under the bunches of moss and loosen them from the sea bottom. Assuming that the pump 10 is in operation at this time, it creates an inward and upward flow of water through the mouth 15, Fig. 4, of the rake 8 which picks up the loosened moss plants, carries them upwardly with it, and discharges them into the screen receptacle 5. The water flows through the mesh of the screen, is withdrawn from the tank 4 by the pump 10 and is discharged overside. These operations are continued until the receptacle 5 is filled to the desired degree, whereupon the cover 6 is removed and the screen is lifted out with its load of moss and is replaced by an empty screen.

Figure 6:
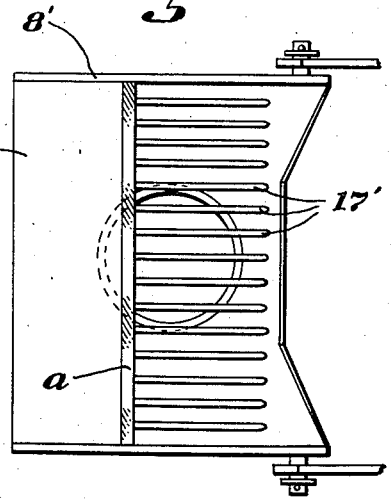
Fig. 6 is a bottom view of a modified form which the rake may take.

Under some conditions it will be found more advantageous to use a rake of the form shown in Fig. 6. It is like illustrated in Figs. 3, 4 and 5 except that the bottom plate 16' terminates in a cutting edge a, and the teeth 17' are made relatively long so that they provide more area on their upper surfaces to support the bunches of moss. The lateral edges of these teeth also may be provided with relatively sharp surfaces so that they will cut, in addition to acting simply as teeth.

Still another form of rake somewhat simpler but well adapted for some conditions is shown at 8" in Figs. 9 and 10. It has a pressed sheet metal body provided with teeth 17" arranged in an arc or a curve, the body being connected with the tube 7 in the same general manner as shown in Figs. 3 and 4.

Figs. 7 and 8 show a novel form of rake which is adapted to be oscillated about its own axis instead of being reciprocated bodily, as are the other implements above described. It comprises a conical casing 24 terminating in its larger end in a cylindrical skirt 25, the latter having a series of feet 26 extending from its edge and adapted to rest on the sea bottom to space the greater part of the extreme lower edge of the casing from such bottom so as to provide for a free inflow of water into the casing. Mounted on the radial arms of a spider 27 supported rigidly in the casing are several curved blades 28, the lower edges of which are toothed. As shown in Fig. 8, the teeth of the three blades at the right-hand side of the device are directed oppositely to the three at the opposite side. Also, two handles 30—30 are connected by ball joints 31—31 with the opposite sides of the casing.

In using this device the operator grasps the handles 30—30 and oscillates the rake about its own axis while moving it step by step along the surface of the ledge. This casing is made considerably larger than those shown in other figures so that it can operate on a larger area in a given unit of time. It is connected with the pipe 7 in the same manner as are the other rakes, and the bunches of moss loosened by it are carried upwardly in the stream of water into the screen 5, in the manner above described.

It will be evident from the foregoing that with an apparatus of the character provided by this invention the operation of gathering sea moss can be performed far more economically and efficiently than it can be done with the prior art hand rake methods. In the latter the operator gathers what moss his rake will hold and then lifts it out into some kind of a receptacle and repeats his raking and gathering operation. Also, he must stop at intervals to empty his basket or other receptacle. With an apparatus of the character shown and described in this application the workman can give his entire time and attention to the matter of raking since the current of water produced by the pump takes the bunches away from the rake practically as fast as they are loosened or cut off. He never has to lift his rake out of the water, unless to avoid an obstruction and his efforts can be directed exclusively to the object of finding moss and raking it.

In this connection it may be pointed out that the sea moss with which this invention is concerned is a totally different vegetable growth from the long stringy sea weeds, such as kelp, which must be harvested by very different methods and apparatus, both totally unsuited to the harvesting of *Chondrus crispis*. The term "sea moss" is herein used to designate this particular species of marine vegetable growth.

While we have herein shown and described preferred embodiments of our invention, it will be evident that the invention may be embodied in other forms without departing from the spirit or scope thereof.

Having thus described our invention, what we desire to claim as new is:

1. A harvesting apparatus for gathering sea moss growing on rocks or ledges on the ocean bottom comprising the combination with a barge, of a tank therein, a screening receptacle mounted in said tank, pipe connections leading into said receptacle and adapted to reach a point located a substantial distance below the bottom of the barge, a suction pump connected with said tank to draw water through said tank, said screening receptacle and said pipe connections, and a rake connected with the lower end of said pipe connections in a fixed relationship to said end where it serves to loosen *Chondrus crispis* plants from the sea bottom in position to be picked up in the current of water flowing upwardly into said receptacle and to be discharged into it thereby.

2. A harvesting apparatus for gathering sea moss growing on rocks or ledges on the ocean bottom comprising the combination of a barge, a receptacle therein, pipe connections running from said receptacle and adapted to reach to a point located a substantial distance below the bottom of the barge, a pump connected into the apparatus to create a flow of water through said connections into said receptacle, a rake at the lower end of said pipe connections and so associated therewith as to cause *Chondrus crispis* plants loosened from the bottom by it to be picked up in the current of water flowing through said connections and carried thereby into said receptacle, operating means for said rake, said connections having a sufficient degree of flexibility to facilitate the raking operations, and means on said barge for supporting the greater part of the weight of said pipe connections while they extend laterally from the barge.

3. A harvesting apparatus for gathering sea moss growing on rocks or ledges on the ocean bottom comprising the combination of a receptacle, a device for pulling *Chondrus crispis* plants from the sea bottom, flexible pipe connections leading from said device to said receptacle, means for creating a flow of water upwardly through said device and said connections to said receptacle, said device being shaped to cause such flow of water to pick up bunches of *Chondrus crispis* so freed from the seat bottom by the operation of the device whereby they will be carried by the stream of water into said receptacle, and means for preventing said bunches of *Chondrus crispis* from being carried into said means for creating said flow of water.

4. A harvesting apparatus for gathering sea moss growing on rocks or ledges on the ocean bottom comprising the combination of a receptacle, a rake comprising a hollow casing having a series of teeth at the lower end thereof, flexible pipe connections leading from said rake to said receptacle, means for creating a flow of water upwardly through said rake and said connections to said receptacle, said casing having an open side in front of said teeth whereby bunches of Chondrus crispis freed from the bottom by the teeth will be picked up by the stream of water flowing inwardly and upwardly through said casing and carried by said stream into said receptacle.

5. A harvesting apparatus for gathering sea moss growing on rocks or ledges on the ocean bottom according to preceding claim 4, including a swivel joint connecting said casing with the lower end portion of said pipe connections.

6. A harvesting apparatus for gathering sea moss growing on rocks or ledges on the ocean bottom according to preceding claim 4, in combination with a handle pivoted to said casing at opposite sides thereof, and a swivel joint connection between the lower end of said pipe and the upper end portion of said casing permitting rotative movement of the rake around the axis of said pipe.

7. A rake for harvesting sea moss growing on rocks or ledges on the ocean bottom, said rake comprising a hollow body, a toothed member secured to said body and extending across a substantial part of the lower end thereof, and means at the upper end of said body for connecting it with a pipe for a swiveling movement relatively thereto.

8. A rake for harvesting sea moss growing on rocks or ledges on the ocean bottom, said rake comprising a hollow body, a toothed member secured to said body and extending across a substantial part of the lower end thereof, and means at the upper end of said body for connecting it with a pipe, the side of said body in front of said teeth being open.

9. A rake for harvesting sea moss growing on rocks or ledges on the ocean bottom, said rake comprising a hollow casing open at one side and having a toothed member extending across the bottom thereof with the teeth facing said open side of the casing, and a handle pivoted to said casing at the opposite sides of the opening therein.

10. A rake for harvesting sea moss growing on rocks or ledges on the ocean bottom, said rake comprising a hollow casing of approximately frusto-conical form, and a series of toothed members supported at the lower end of said casing and arranged radially around the axis thereof but at approximately right angles thereto.

11. A harvesting apparatus for gathering sea moss growing on rocks or ledges on the ocean bottom, comprising the combination of a barge, a receptacle therein, pipe connections running from said receptacle and adapted to reach to a point located a substantial distance below the bottom of the barge, a pump connected into the apparatus to create a flow of water through said connections into said receptacle, a rake connected to the lower end of said pipe connections whereby Chondrus crispis plants loosened from the bottom by said rake will be picked up in the current of water flowing through said connections and carried thereby into said receptacle, and means for preventing said plants from being carried into said pump.

12. A harvesting apparatus for gathering sea moss growing on rocks or ledges on the ocean bottom according to preceding claim 4, in which said rake is equipped with a handle, said open side facing toward said handle when the device is being operated and said teeth pointing toward said opening.

EDWARD R. KNOWLTON.
GEORGE F. DOUCETTE.
JOHN W. EAGER.